United States Patent [19]

Clevenger, Jr. et al.

[11] Patent Number: 5,327,823
[45] Date of Patent: Jul. 12, 1994

[54] SPLICE FOR ROUND BALER BELTS

[75] Inventors: James T. Clevenger, Jr.; Irwin D. McIlwain, both of Lancaster, Pa.

[73] Assignee: Ford New Holland, Inc., New Holland, Pa.

[21] Appl. No.: 56,270

[22] Filed: May 3, 1993

[51] Int. Cl.⁵ .......................... B30B 5/06; B30B 9/30
[52] U.S. Cl. .......................... 100/88; 24/33 P; 24/33 C; 56/341; 198/844.2; 474/255
[58] Field of Search .................. 100/88; 56/341; 24/33 R, 33 P, 33 B, 33 C, 34, 38; 198/844.2; 474/253, 255-258

[56] References Cited

U.S. PATENT DOCUMENTS

| | | | |
|---|---|---|---|
| 923,546 | 6/1909 | Maxwell | 24/34 X |
| 1,427,856 | 9/1922 | Rutz | 24/33 C X |
| 1,633,939 | 6/1927 | Grace | 24/33 P |
| 1,659,883 | 2/1928 | Lorentz | 24/33 C |
| 2,629,909 | 3/1953 | Hall | 24/33 C |
| 4,371,580 | 2/1983 | Morrison et al. | 428/250 |
| 4,518,647 | 5/1985 | Morrison | 428/250 |
| 4,611,367 | 9/1986 | Meulenberg et al. | 24/33 B X |
| 4,900,609 | 2/1990 | Arnold | 428/163 |
| 4,944,716 | 7/1990 | Graff | 24/33 C X |
| 5,136,832 | 8/1992 | Sund | 24/33 P X |

FOREIGN PATENT DOCUMENTS 444469 5/1927 Fed. Rep. of Germany ...... 474/255
770690 9/1934 France ........................... 198/844.2

OTHER PUBLICATIONS

Publication No. LIT 1217 Clipper Clipboard, Clipper Belt Lacer Company 1995 Oak Industrial Drive., NE Grand Rapid, Mich., no date.

*Primary Examiner*—Stephen F. Gerrity
*Attorney, Agent, or Firm*—Frank A. Seemar; Larry W. Miller

[57] ABSTRACT

A round baler having a bale forming chamber including one or more transversely mounted rolls and at least one elongated belt having opposing ends spliced together to form a continuous band. The splice includes a first and a second series of similar side-by-side loops connected to and extending from the respective opposing ends of the belt, and an attaching element extending through the first and second series of loops to maintain the opposing ends of the belt in alignment and close proximity to each other. Retention components affixed to the attaching element retain it in operative relationship to the first and second series of loops and are disposed outwardly of the outer loops.

9 Claims, 4 Drawing Sheets

SPLICE FOR ROUND BALER BELTS

FIELD OF THE INVENTION

The present invention relates generally to a belt used in round balers and more particularly improved means for securing the ends of the belt together to form a continuous band.

BACKGROUND OF THE INVENTION

Round balers generally have a bale forming chamber defined by an apron comprising an array of side-by-side belts, transverse slats trained on chains, a plurality of rolls or a combination of these various elements, e.g., rolls and belts. During field operation, crop material such as hay is picked up from the ground as the baler traverses the field and is fed into a fixed or adjustable diameter chamber where it is rolled up to form a compact cylindrical bale. The formed bale is wrapped in its compacted form while still inside the bale forming chamber by net, twine or the like, prior to ejecting the bale from the chamber onto the ground for subsequent handling.

Round balers of the general type mentioned above comprising a chamber defined (at least partly) by a plurality of side-by-side longitudinally extending belts supported on a plurality of transverse rollers, frequently utilize belts of a predetermined length with the opposing ends secured together to form a continuous band. The ends are spliced together by using known techniques, one of the most common of which is disclosed in U.S. Pat. No. 4,371,580, issued on Feb. 1, 1983. This technique, designated as "Prior Art" and shown in FIG. 2 of the drawings, includes the use of a rod 2 threaded through first and second series of loops extending from the opposing ends of the belt 3. The ends of rod 2 are bent to hold it in place and thereby permit the splice to retain belt 3 in its continuous band configuration.

Another known technique is disclosed in Publication No. LIT 1217 issued by the Clipper Belt Company of Grand Rapids Mich., wherein a similar arrangement is contemplated. This technique, illustrated in FIGS. 3-5, employs a clip fastener 4 (FIG. 3) positioned as shown in FIG. 4 and crimped to the rod in a conventional manner as shown in FIG. 5.

Although prior art round baler belt splice arrangements have met with varying degrees of success, no solution exists that goes to the root of the problem, i.e., the need to provide a simple and inexpensive splice that enhances the life of the continuous round baler belt and thereby reduce down time which in turn results in an improvement in overall reliability of the machine.

SUMMARY OF THE INVENTION

An important object of the present invention is to provide a round baler belt splice that overcomes the above problem and thereby improves the overall baler performance.

In pursuance of this and other important objects the present invention provides an improvement for round balers having a frame, means for providing a bale forming chamber including one or more rolls mounted transversely on the frame, at least one elongated belt having opposing ends secured together to form a continuous band, and in which the belt is trained about and supported on rolls to define the chamber. A splice for securing together the opposing ends of the belt comprises first and second series of similar side-by-side loops connected to and extending from the respective opposing ends of the belt and an attaching element extending through the first and second series of loops to maintain the opposing ends of the belt in alignment and close proximity to each other. The baler also includes drive means for moving the belt in engagement with the rolls along a path that defines the outer periphery of the chamber, means for feeding the crop into the chamber to form a bale under conditions where the belt is moving in engagement with the crop material, and means for discharging the formed bale from the chamber.

According to the broadest aspect of the invention, apparatus of the type set forth above is provided wherein the improvement comprises retention means affixed to the attaching element to retain it in operative relationship to the first and second series of loops, the retention means being disposed outwardly of the loops of the splice means. A more limited aspect contemplates an attaching element comprising a rod with the retention means crimped on the end of the rod.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
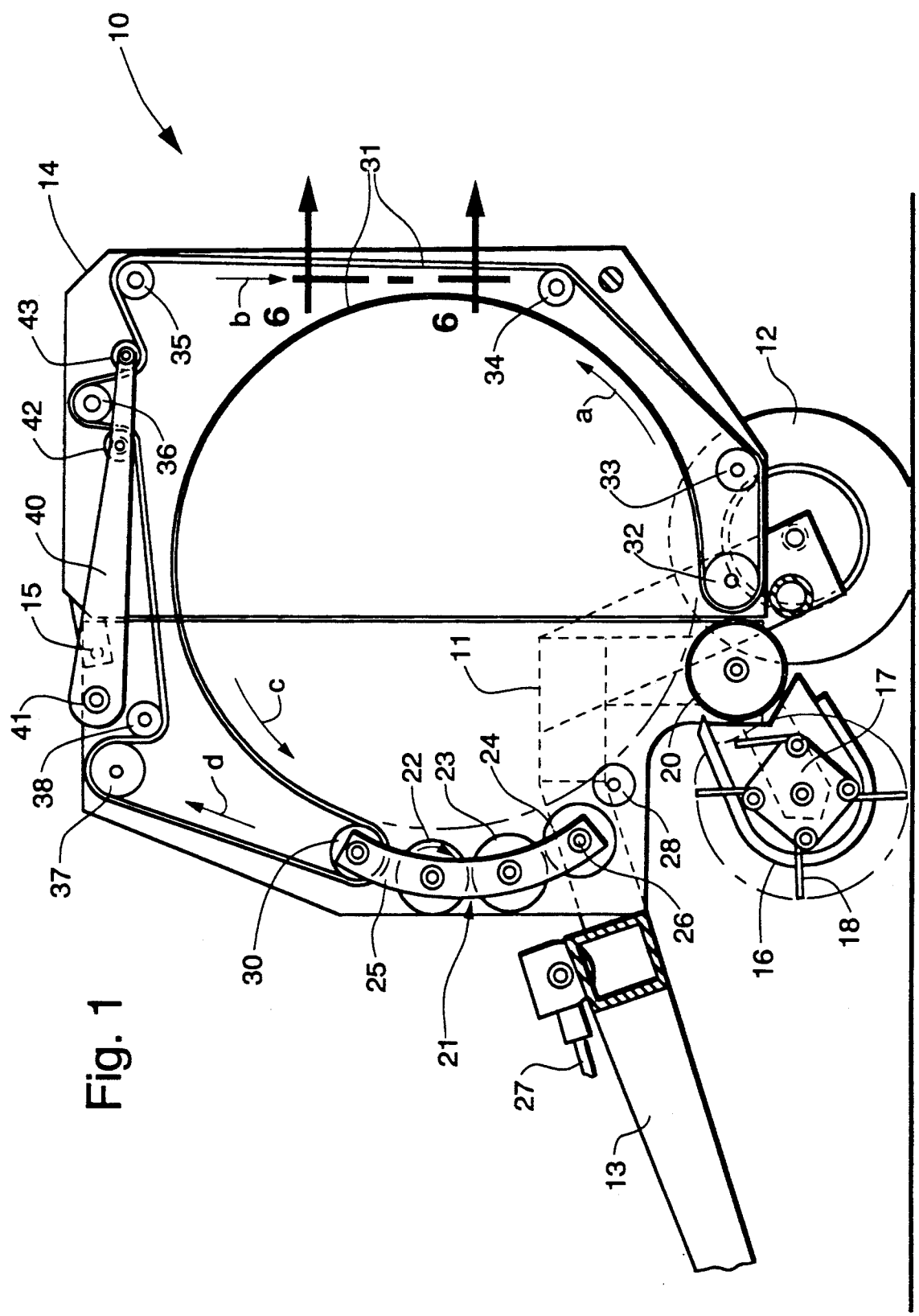
FIG. 1 is a diagrammatic side elevational view of a round baler in which the present invention is embodied.
Figure 2:
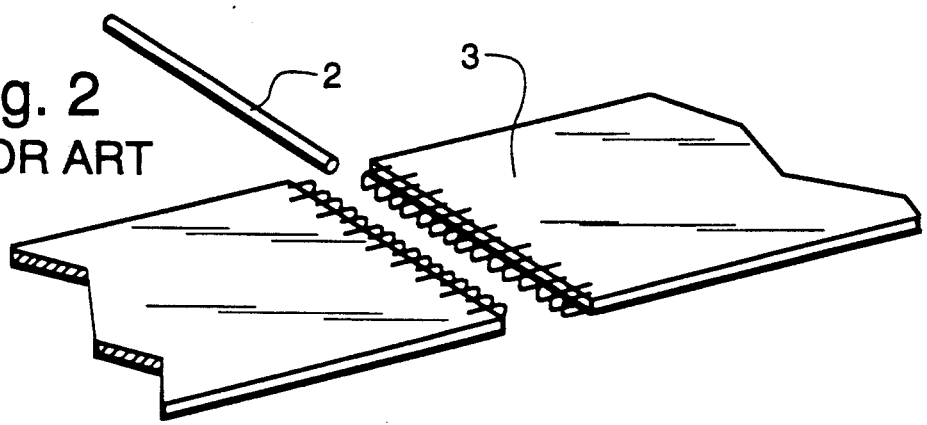
FIG. 2 is a perspective view of a prior art belt splice using a rod in combination with loops.
Figure 3:
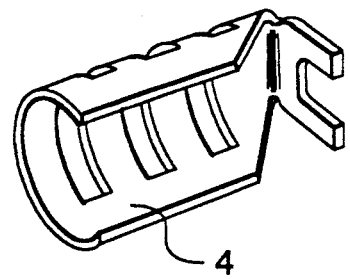
FIGS. 3-5 show diagrammatically a prior art belt splice arrangement using a clip fastener in combination with a rod and loops.
Figure 4:
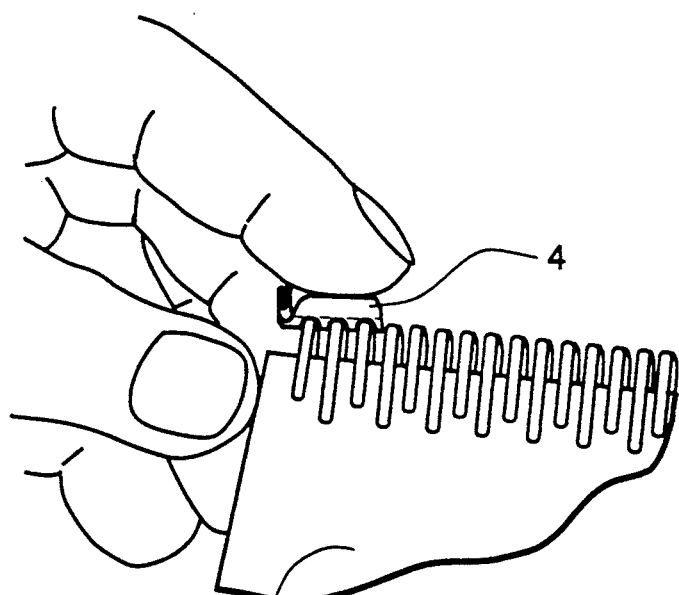
Figure 5:
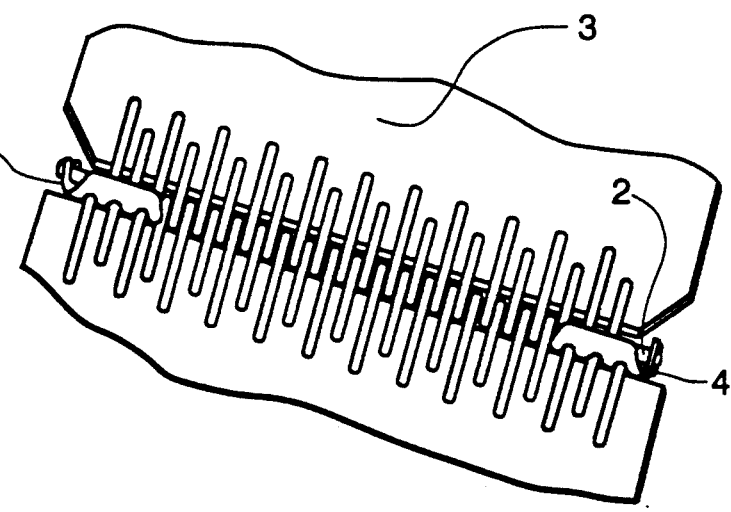

Referring now to the drawings for a more detailed description, FIG. 1 shows one type of expandable chamber round baler 10 in which the preferred embodiment of the invention is readily incorporated. Baler 10 is disclosed in detail in U.S. Pat. No. 4,870,812 issued on Oct. 3, 1989 in the name of R. E. Jennings et al. It includes a main frame 11 supported by a pair of wheels 12. A tongue 13 is provided on the forward portion of main frame 11 for connection to a tractor (not shown). A tailgate 14 is pivotally connected to main frame 11 by a stub shaft 15 and a similar opposing stub shaft (not shown) so that tailgate 14 may be pivoted from the closed position shown in FIG. 1 to an opened position shown and described in the Jennings et al patent mentioned above. A conventional pickup 16, mounted on main frame 11 by a pair of brackets 17, includes a plurality of fingers or tines 18 moveable in a predetermined path (shown in phantom outline) to lift crop material from the ground and deliver it rearwardly toward a floor roll 20 which is rotatably mounted on main frame 11.

The baler includes sledge assembly 21 having a plurality of transversely extending rollers 22, 23, 24 journalled at their ends in a pair of arcuately shaped opposing arms 25. Arms 25 are pivotally mounted on main frame 11 by a pair of stub shafts 26 for permitting movement of sledge assembly 21 between a bale starting position, shown and described in Jennings et al, and the full bale position shown in FIG. 1. Rollers 22, 23, 24 are driven in a clockwise direction (see arrow on roll 22) by conventional means (for example, chains and sprockets or gears) connected to a drive shaft 27 driven by the PTO of a tractor. A starter roll 28, located adjacent roller, 24 is also driven in a clockwise direction to enhance core starting and strip crop material from roller 24. A freely rotatable idler roller 30 is carried by arms 25 for movement in an arcuate path when sledge assembly 21 pivots between the bale starting position and the full bale position.

A plurality of side-by-side belts 31 are supported on guide rolls 32, 33, 34, 35, 36, rotatably mounted in tailgate 14 a drive roll 37 which is rotatably mounted in main frame 11. Belts 31 pass between sledge roller 22 and idler roller 30 in engagement with idler roller 30. Roller 22, located in close proximity to belts 31, strips crop material therefrom. Coupling means (not shown) connect drive shaft 27 to drive roll 37 causing movement of belts 31 in the direction indicated by arrows a, b, c and d, the inner course of which is designated by arrows a & c. An additional guide roll 38 in main frame 11 ensures proper driving engagement between belts 31 and drive roll 37. A pair of arms 40 (one shown) are pivotally mounted on main frame 11 by a cross shaft 41 for movement during bale formation between inner and outer positions, the outer full bale position being shown in FIG. 1. Arms 40 carry additional guide rolls 42, 43 for guiding belts 31. Resilient means (not shown) are provided to urge arms 40 toward their inner position while resisting movement thereof to the outer position. A complete description of bale formation in baler 10 is provided in the Jennings et al patent.

For the purpose of the present invention, it should be generally understood that as round baler 10 is towed across a field, pickup tines 18 lift crop material from the ground and feed it into the bale forming chamber via a throat defined by roller 28 spaced from floor roller 20. The crop material is conveyed by floor roll 20 into engagement with a series of inwardly facing moving surfaces comprising the inner course of the apron belts and rollers 22, 23, 24 and 28, whereby it is coiled in a counterclock-wise direction to form a bale. During such formation, continued feeding of crop material into the chamber by pickup tines 18 causes the apron belts 31 to expand until arms 40 rotate to their shown position. When a full bale has been so formed, it is then wrapped with a suitable material, such as twine or net, tailgate 14 is opened and the bale is ejected. Subsequent closing of tailgate 14 returns apron belts 31 to their initial position (not shown) and round baler 10 is again ready to form another bale.

Figure 6:
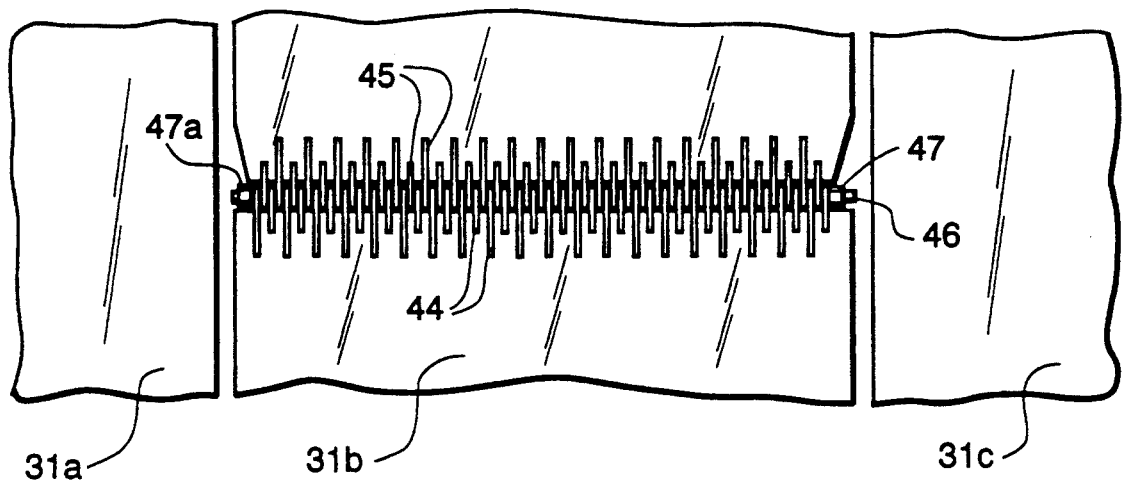
FIG. 6 is a view taken in the direction of arrows 6—6 in FIG. 1.
Figure 7:
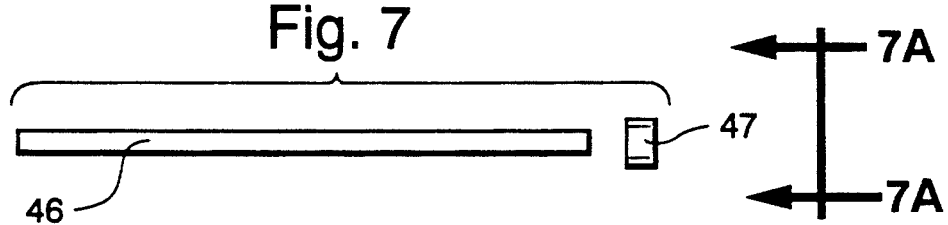
FIG. 7 shows the attaching element and retention means of the present invention.
Figure 7A:
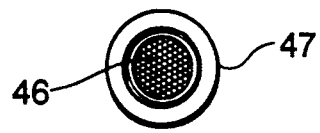
FIG. 7A is a view taken in the direction of arrows 7A—7A in FIG. 7.

Now turning to the belt splicing invention to which the present application is directed, FIG. 6 shows a portion of three side-by-side belts 31, designated by reference numerals 31a, 31b and 31c. Each elongated belt 31 is formed into a continuous band by splicing the opposing ends together as shown for belt 31b in FIG. 6. Belts 31a and 31c are spliced at different locations along their length by a similar splice. The splice comprises a first series of side-by-side loops 44 secured to one end of belt 31b, a second similar series of side-by-side loops 45 secured to the opposing ends of belt 31b, an attaching element 46 and retention means 47 affixed to both ends of element 46 after it has been inserted transversely through loops 44 and 45.

Figure 8:
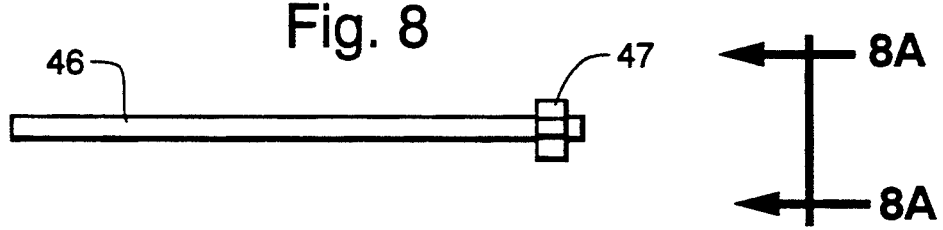
FIG. 8 is similar to FIG. 7 and shows the retention means of the present invention attached to one end of the attaching element.
Figure 8A:
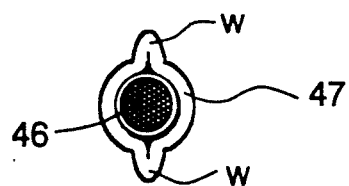
FIG. 8A is a view taken in the direction of arrows 8A—8A in FIG. 8.

More specifically, attaching element 46 consists of a length of cable equal to or slightly less than the width dimension of the belt. Retention means 47 consists of a thin walled tube having an inner diameter slightly greater than the diameter of the cable. The tube when crimped on the ends of the cable takes the shape shown best by FIGS. 8A and 9A, i.e., the circular ring shape is deformed to one having diametrically opposed winglike portions w. The first series of loops 44 comprise loops (FIG. 9A) of wire extending a like distance from the end 48 of belt 31b. Likewise the second series of loops 45 comprise similar like loops of wire extending from the opposing end 50 of belt 31b. All loops 44 are anchored in the belt at ends 51, 52, 53 and 54 whereas ends 55, 56, and 57, 58, represent respectively, the ends of loops 45. Both series of loops anchor at depth locations that alternate along the width of the belt.

Figure 9:
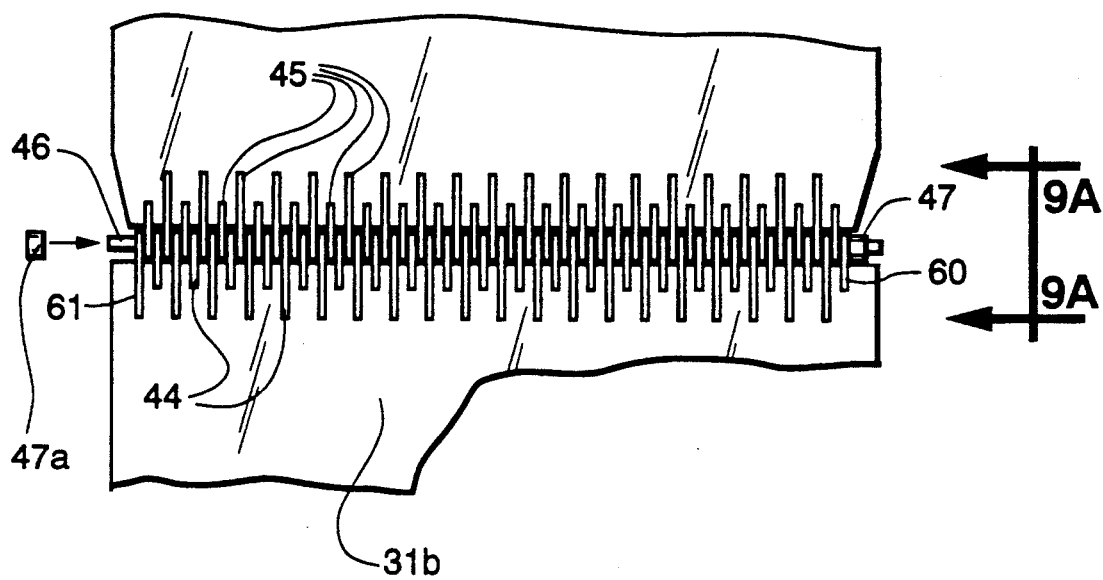
FIG. 9 is similar to FIG. 6 and shows the attaching element in operative position with retention means attached to only one end.
Figure 9A:
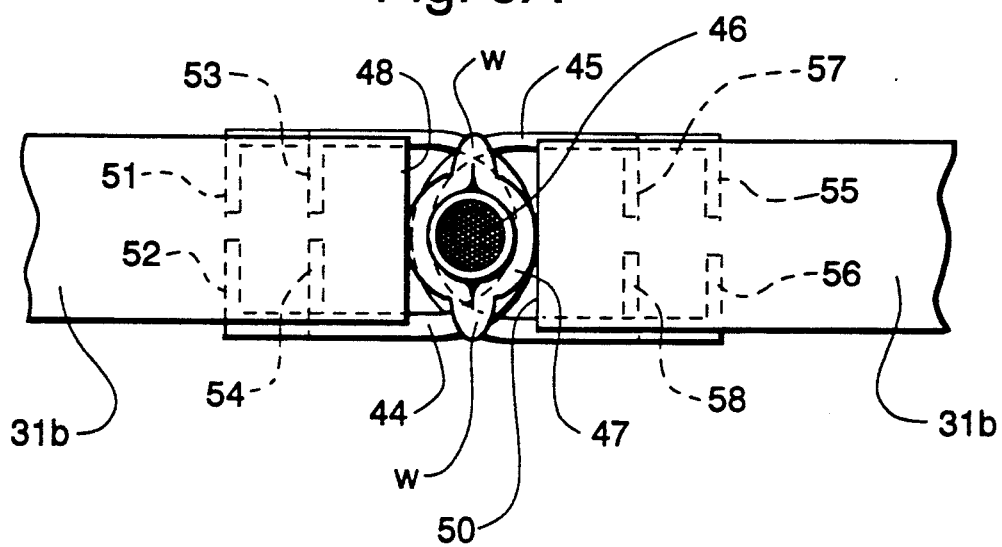
FIG. 9A is a view taken in the direction of arrows 9A—9A in FIG. 9.

In operation, the ends of belt 31b are spliced together by first abutting the opposing series of rings against the opposing belt end in a mating fashion to form a passage that receives attaching element 46, as best depicted in FIG. 9A. Retention means 47 is secured to one end of element 46 (FIG. 8), and the combination is threaded through the loops until 47 is in contact with the end loop 60 (see FIG. 9). Retention means 47a is then secured to the other end of element 46 by urging the thin walled tube coaxially along the cable until it is snug against outer loop 61 and then crimping it to element 46, resulting in the completed splice shown in FIG. 6.

It should be noted that movement of the spliced belt during operation causes vibration and flexing resulting in some instances in rotation of element 46, but regardless of the orientation of element 46 it is secured against transverse movement by virtue of the relationship of element 46 to the loops shown in FIG. 9A. In the event wear and manufacturing tolerances permit the distance between opposing ends 48 and 50 to increase slightly, then wings w will assist in maintaining the integrity of the splice.

It has been determined that round balers using belts spliced in accordance with the present invention have reduced down time caused by belt failure. The belt ends are held in alignment and less likely to permit the attaching element to creep laterally due to the snugly fit, simply accomplished securement of the retention means to the cable, which arrangement has been found to be most successful if in its crimped condition does not extend beyond the thickness of the belt and thereby avoids undesirable contact with belt side guides commonly used in round balers. Furthermore, this arrangement reduces the likelihood of failure of the outer loops by obviating lateral outward movement of such outer loops. Although, a thin walled tube has been found to successfully contribute to the accomplishment of the purpose of the present invention other similar means such as a swaged ball of metal could be used without adversely affecting the improved reliability.

While preferred structure in which the principles of the present invention have been incorporated is shown and described above, it is to be understood that the invention is not limited to such structure, but that, in fact, widely different means of varying scope and configuration may be employed in the practice of the invention.

Having thus described the invention, what is claimed is:

1. In a round baler having
   a frame,
   means for providing a bale forming chamber including at least one roll mounted transversely on said frame, and at least one elongated belt having opposing ends secured together to form a continuous band, said belt trained about and supported on said at least one roll to define said chamber,
   splice means for securing together said opposing ends of said belt, said splice means comprising a first and a second series of similar side-by-side loops connected to and extending from the respective opposing ends of said belt, and an attaching element extending through said first and second series of loops to maintain said opposing ends of said belt in alignment and close proximity to each other,
   drive means for moving said belt in engagement with said at least one roll along a path that defines the outer periphery of said chamber,
   means for feeding said crop into said chamber to form a bale under conditions where said belt is moving in engagement with said crop material,
   means for discharging said formed bale from said chamber, and
   retention means affixed to said attaching element to retain said attaching element in operative relationship to said first and second series of loops, said retention means disposed outwardly of said loops of said splice means, the improvement comprising said attaching element comprises a rod and said retention means comprises an element that encircles said rod and is crimped on said rod in the vicinity of the end thereof.

2. A round baler as set forth in claim 1 wherein said rod is generally circular in cross section and said retention means comprises a thin walled tube having an inner diameter greater than the diameter of said rod.

3. A round baler as set forth in claim 1 wherein said opposing ends of said elongated belt are generally parallel to each other and transverse to said band, one of said opposing ends of said elongated belt has a portion removed from one of the edges adjacent said end, and said retention means is crimped on said rod in a recessed manner such that it does not extend beyond said edge.

4. A round baler as set forth in claim 3 wherein said side-by-side loops include a side loop extending from said one of said opposing ends of said elongated belt adjacent said one edge, and said retention means is contiguous with said side loop.

5. In a round baler having
   a frame,
   means for providing a bale forming chamber including at least one roll mounted transversely on said frame, and at least one elongated belt having opposing ends secured together to form a continuous band, said belt trained about and supported on said at least one roll to define said chamber,
   splice means for securing together said opposing ends of said belt, said splice means comprising a first and a second series of similar side-by-side loops connected to and extending from the respective opposing ends of said belt, and an attaching element extending through said first and second series of loops to maintain said opposing ends of said belt in alignment and close proximity to each other,
   drive means for moving said belt in engagement with said at least one roll along a path that defines the outer periphery of said chamber,
   means for feeding said crop into said chamber to form a bale under conditions where said belt is moving in engagement with said crop material,
   means for discharging said formed bale from said chamber, and
   retention means affixed to said attaching element to retain said attaching element in operative relationship to said first and second series of loops, said retention means disposed outwardly of said loops of said splice means, the improvement comprising said attaching element comprises a section of flexible cable and said retention means comprises an element that encircles said flexible cable and is crimped on said flexible cable in the vicinity of the end thereof.

6. A round baler as set forth in claim 5 wherein said flexible cable is generally circular in cross section and said retention means comprises a thin walled tube having an inner diameter greater than the diameter of said flexible cable.

7. A round baler as set forth in claim 6 wherein said flexible cable includes an outer plastic circumferential layer.

8. A round baler as set forth in claim 5 wherein said opposing ends of said elongated belt are generally parallel to each other and transverse to said band, one of said opposing ends of said elongated belt has a portion removed from one of the edges adjacent said end, and said retention means is crimped on said flexible cable in a recessed manner such that it does not extend beyond said edge.

9. A round baler as set forth in claim 8 wherein said side-by-side loops include a side loop extending from said one of said opposing ends of said elongated belt adjacent said one edge, and said retention means is contiguous with said side loop.

* * * * *